Patented June 11, 1935

2,004,131

UNITED STATES PATENT OFFICE 2,004,131

PROCESS OF SEPARATING ALCOHOLS

Ebenezer E. Reid, Baltimore, Md., assignor to E. I. du Pont de Nemours & Company, Wilmington, Del., a corporation of Delaware No Drawing. Application April 25, 1933, Serial No. 667,862

21 Claims. (Cl. 260—156)

This invention relates to a new process for the separation of unsaturated alcohols, and particularly to a process whereby unsaturated alcohols are separated from mixtures thereof with saturated alcohols.

Until the present process no satisfactory method has been devised for the separation of higher saturated and unsaturated alcohols. The best methods hitherto seem to be crystallization from acetone (Toyama, Chemische Umschau, vol. 31, pages 61 and 153, 1924) and fractional distillation.

This invention has as an object the separation of unsaturated alcohols from saturated alcohols. A further object is the purification of unsaturated alcohols obtainable in chemical processes in admixture with saturated alcohols. Other objects will appear hereinafter.

These objects are accomplished by the following invention wherein the unsaturated alcohols are separated from mixtures thereof with saturated alcohols by extraction with a medium comprising sulfur dioxide. When a mixture of higher saturated and unsaturated alcohols is treated with liquid sulfur dioxide, the unsaturated alcohols dissolve in the sulfur dioxide and the saturated alcohols remain as an insoluble residue. The unsaturated alcohols may be recovered from their solution in the sulfur dioxide by evaporating off the solvent. The following examples illustrate the process:

Example 1.—The oil of Ruvettus Pretiosus consists of about equal portions of saponifiable and unsaponifiable constituents, the unsaponifiable constituents being normal straight chain alcohols. The unsaponifiable fraction from a sample of this oil was extracted in an extraction apparatus of the Soxhlet type, the condenser thereof being open at the top for the introduction of powdered carbon dioxide. The material was extracted with liquid sulfur dioxide for five hours, during which 47% of the material was extracted. The degree of separation is indicated by the following iodine numbers: original, 58; extract, 106; residue 13. The residue from the first extract on a second extraction for five hours lost 13.9%; the iodine number of the final residue was 2.2 and that of the extract 65.

Example 2.—A sample of ocenol, a mixture containing chiefly oleyl and stearyl alcohols, was extracted as in Example 1 for six hours, during which 53% was extracted. The iodine number of the residue was 38.8, that of the extract 98, and that of the original material 68.4. Evaporation of the sulfur dioxide from the extract gave practically pure oleyl alcohol.

In both of the above examples an extraction apparatus of the Soxhlet type was used, but such apparatus is not necessary. Any means whereby an intimate contact of the material to be extracted with the extracting medium can be attained is within the purview of this invention. Thus the mixture of alcohols may be agitated with the extraction medium as in the following example.

Example 3.—A sample of mixed stearyl and oleyl alcohols, iodine number 82, was prepared by the catalytic hydrogenation of oleic acid. This was extracted in the following manner. A liter of liquid sulfur dioxide was introduced into a 5-liter flask and 150 g. of the alcohol mixture was added slowly with stirring. The stirring was continued for an additional one-half hour after which the mixture was allowed to separate into two phases. The lower liquid phase was blown over into another flask and the sulfur dioxide was recovered by distillation, leaving the extracted oleyl alcohol as a residue. One hundred and fifty grams of fresh crude alcohol was then added to the insoluble portion from the first extraction and treated with a liter of sulfur dioxide as before. After three such extractions had been made, the entire insoluble portion was washed with a liter of liquid sulfur dioxide. By repeatedly carrying out this cycle of operations on a total of 1772 g. of crude oleyl-stearyl alcohol, and distilling the sulfur dioxide extract in vacuo, there was obtained about 1120 g. of pure oleyl alcohol which on analysis shown % C—80.63, % H—13.28, and iodine number 94.5 as compared with the calculated values % C—80.51, % Hydrogen—13.52, and iodine number—94.62 for oleyl alcohol.

The mixture of alcohols and sulfur dioxide may be charged into a pressure vessel and agitated at a temperature above the melting point of the alcohols.

In the use of elevated temperatures and pressures the temperature should preferably be sufficiently low to prevent the admixture of the saturated alcohol and liquid sulfur dioxide. The best results are obtained near the boiling point of sulfur dioxide at atmospheric pressure, i. e., $-12°$ C. Above $10°$ C. saturated alcohols become measurably soluble in liquid sulfur dioxide so that the efficiency of the separation is lessened. Some degree of success can be obtained however by charging liquid sulfur dioxide and the mixture of alcohols into a pressure vessel, agitating at higher temperatures at which the entire mixture is homogeneous, and thereafter cooling until the saturated alcohol precipitates from solution, the two phases then being separated. At temperatures far below −12° C., the solubility of oleyl alcohol decreases to such an extent that the separation, while complete, is less advantageous because of the large amount of extraction medium required.

In extractions undertaken at temperatures above the melting point of the alcohol mixture, but below the point of homogeneous admixture with sulfur dioxide the agitation should be especially efficient in order to maintain intimate contact between the two liquids. The process may be made continuous, for example, by withdrawing a portion of the sulphur dioxide layer, evaporating off the solvent and condensing it, and then introducing it at the top of the alcohol layer through which it sinks. This introduction at the top of the alcohol layer is preferably so carried out that the sulfur dioxide is very thoroughly dispersed into the alcohol layer, thus affording greater contact and more ready extraction.

It is not necessary that the sulfur dioxide be the only constituent of the extraction medium. A solution of substantial amounts of sulfur dioxide in methanol, benzene, diethyl ether, ethyl acetate, or liquid olefines such as amylene, or other organic solvent for the sulfur dioxide may be used to effect the separation of the unsaturated alcohols from mixtures thereof. By this means the separation may be effected at room temperature and atmospheric pressure. The alcohol mixture containing the unsaturated alcohol may also be mixed with a solvent therefor which is not miscible with sulfur dioxide, for example, chloroform, carbon tetrachloride, ethylene dichloride, or other halogenated hydrocarbon, dichlorodiethyl ether, dichlorodipropyl ether, or other halogenated ether, and liquid paraffin hydrocarbons, such as the mixture known as petroleum ether, in such amounts as to lower the melting point of the alcohol mixture sufficiently to render it liquid at the temperatures of liquid sulfur dioxide. This is of advantage in allowing more intimate contact, and consequently more efficient extraction. The same result can be obtained without the use of this liquid melting point depressant by very finely dividing the material, inasmuch as the efficiency of extraction is dependent upon the fineness of the material.

While the examples disclose the separation of oleyl from stearyl alcohol and the separation of the saturated and unsaturated portions of the oil of Ruvettus Pretiosus, the process is applicable in general to the separation of unsaturated alcohols from saturated alcohols containing approximately the same or a larger number of carbon atoms and preferably at least 10 carbon atoms. Thus, citronellyl, linalyl, geranyl, linoleyl, eleostearyl, elaidyl, neryl, undecylenyl, and heptadienyl alcohols may be separated from saturated alcohols containing at least 10 carbon atoms, such as decyl, cetyl, stearyl, and palmityl alcohols. The process may also be used for the separation of lower unsaturated alcohols, such as allyl and crotyl, from higher saturated alcohols.

The separation of unsaturated alcohols from saturated alcohols of less than ten carbon atoms is feasible but is not so advantageous as is the separation from higher saturated alcohols since the high solubility of the low molecular weight alcohol in liquid sulfur dioxide requires abnormally low temperatures. Alcohols of approximately the same boiling point, e. g. butyl and crotyl alcohols, may be thus separated although their separation by fractional distillation would be difficult if not impossible. The separation of higher unsaturated alcohols such as oleyl, from saturated alcohols of much lower carbon content, such as butyl, is not highly successful because of the slight solubility of the unsaturated alcohol in liquid sulfur dioxide at the requisite low temperature.

Mixtures containing saturated and unsaturated alcohols are not infrequently obtained from the carboxyl hydrogenation of fats and fatty oils, and are frequently difficult of separation by any means other than the present process.

The unsaturated alcohols prepared in purer form by this method of separation may be used in the preparation of wetting agents, dispersing agents, foaming agents, and similar materials.

The process of the present invention is by far the most satisfactory means of separating saturated from unsaturated alcohols, as is shown by a comparison of the methods of separation of the saturated from the unsaturated alcohols in the unsaponifiable fraction of the oil of Ruvettus Pretiosus. The table shows the results obtained by the two methods of the prior art and the method of the present invention:—

*Table*

1. Crystallization from acetone—melting points ° C., 33—34 36 38. Iodine numbers of portions distilled from last product, 12, 16 and 52

| 2 | Distillation fractions | 1 | 2 | 3 | 4 | 5 | 6 | 7 | Residue |
|---|---|---|---|---|---|---|---|---|---|
|   | Iodine numbers | 19 | 18 | 23 | 43 | 59 | 69 | 76 | 146 |

| | | | | Iodine numbers | | |
|---|---|---|---|---|---|---|
| | SO₂ extraction | Time | Percent extracted | Original | Extract | Residue |
| 3 | A | 5 hrs | 47.0 | 58 | 106 | 13 |
|   | B | 5 hrs | 13.9 | 13 | 65 | 2.2 |

This table table makes it quite apparent that sulfur dioxide extraction is by far more efficient than either crystallization or distillation.

As many apparently widely different embodiments of this invention may be made without departing from the spirit and scope thereof, it is to be understood that the invention is not limited to the specific embodiments thereof except as defined in the appended claims.

I claim:

1. A process of separating an unsaturated alcohol from a mixture essentially comprising said alcohol and a saturated alcohol of approximately at least the same number of carbon atoms, which comprises extracting the unsaturated alcohol from the mixture by means of an extraction medium essentially comprising liquid sulfur dioxide at a temperature below about 10° C.

2. The process of claim 1 in which the extraction is carried out under super-atmospheric pressure.

3. The process of separating an unsaturated alcohol from a mixture essentially comprising said alcohol and a saturated alcohol of at least ten carbon atoms, which comprises extracting the unsaturated alcohol from said mixture by means of an extraction medium essentially comprising liquid sulfur dioxide at a temperature below about 10° C.

4. The process of separating an unsaturated alcohol from a mixture essentially comprising said alcohol and a saturated alcohol of at least ten carbon atoms, which comprises extracting the unsaturated alcohol from said mixture by means of an extraction medium consisting essentially of liquid sulfur dioxide at a temperature below about 10° C.

5. The process of separating an unsaturated alcohol from a mixture essentially comprising said alcohol and a saturated alcohol of at least ten carbon atoms, which comprises extracting the unsaturated alcohol from said mixture by means of liquid sulfur dioxide dissolved in a solvent therefor, the extraction taking place at a temperature below about 10° C.

6. The process which comprises separating by extraction with liquid sulfur dioxide an unsaturated alcohol from a mixture essentially comprising said alcohol and a saturated alcohol of at least ten carbon atoms, and a volatile organic solvent for said alcohols, said solvent being substantially immiscible with sulfur dioxide, the extraction being carried out at a temperature below about 10° C.

7. The process of separating oleyl alcohol from mixtures essentially comprising the same and saturated alcohols of at least ten carbon atoms, which comprises extracting said mixture by means of liquid sulfur dioxide at a temperature below about 10° C.

8. The process of separating an unsaturated alcohol from a mixture essentially comprising said alcohol and a saturated alcohol of approximately at least the same number of carbon atoms, which comprises extracting the unsaturated alcohol from the mixture by means of an extraction medium essentially comprising liquid sulfur dioxide at a temperature in the neighborhood of minus 12° C.

9. The process of claim 8 in which the extraction is carried out under super-atmospheric pressure.

10. The process of separating an unsaturated alcohol from a mixture essentially comprising said alcohol and a saturated alcohol of at least ten carbon atoms, which comprises extracting the unsaturated alcohol from said mixture by means of an extraction medium essentially comprising liquid sulfur dioxide at a temperature in the neighborhood of minus 12° C.

11. The process of separating an unsaturated alcohol from a mixture essentially comprising said alcohol and a saturated alcohol of at least ten carbon atoms, which comprises extracting the unsaturated alcohol from said mixture by means of an extraction medium consisting essentially of liquid sulfur dioxide at a temperature in the neighborhood of minus 12° C.

12. The process of separating an unsaturated alcohol from a mixture essentially comprising said alcohol and a saturated alcohol of at least ten carbon atoms, which comprises extracting the unsaturated alcohol from said mixture by means of liquid sulfur dioxide dissolved in a solvent therefor, the extraction taking place at a temperature in the neighborhood of minus 12° C.

13. The process which comprises separating by extraction with liquid sulfur dioxide an unsaturated alcohol from a mixture essentially comprising said alcohol, a saturated alcohol of at least ten carbon atoms, and a volatile organic solvent for said alcohols, said solvent being substantially immiscible with liquid sulfur dioxide, the extraction being carried out at a temperature in the neighborhood of minus 12° C.

14. The process of separating oleyl alcohol from mixtures essentially comprising the same and saturated alcohols of at least ten carbon atoms, which comprises extracting said mixture by means of liquid sulfur dioxide at a temperature in the neighborhood of minus 12° C.

15. A process of separating an unsaturated alcohol from a mixture essentially comprising said alcohol and a saturated alcohol of approximately at least the same number of carbon atoms, which comprises extracting the unsaturated alcohol from the mixture by means of an extraction medium essentially comprising liquid sulfur dioxide at a temperature at which the saturated alcohol is substantially insoluble and the unsaturated alcohol is substantially soluble.

16. The process of claim 15 in which the extraction is carried out under super-atmospheric pressure.

17. The process of separating an unsaturated alcohol from a mixture essentially comprising said alcohol and a saturated alcohol of at least ten carbon atoms, which comprises extracting the unsaturated alcohol from said mixture by means of an extraction medium essentially comprising liquid sulfur dioxide at a temperature at which the saturated alcohol is substantially insoluble and the unsaturated alcohol is substantially soluble.

18. The process of separating an unsaturated alcohol from a mixture essentially comprising said alcohol and a saturated alcohol of at least ten carbon atoms, which comprises extracting the unsaturated alcohol from said mixture by means of an extraction medium consisting essentially of liquid sulfur dioxide at a temperature at which the saturated alcohol is substantially insoluble and the unsaturated alcohol is substantially soluble.

19. The process of separating an unsaturated alcohol from a mixture essentially comprising said alcohol and a saturated alcohol of at least ten carbon atoms, which comprises extracting the unsaturated alcohol from said mixture by means of liquid sulfur dioxide dissolved in a solvent therefor, the extraction taking place at a temperature at which the saturated alcohol is substantially insoluble and the unsaturated alcohol is substantially soluble.

20. The process which comprises separating by extraction with liquid sulfur dioxide an unsaturated alcohol from a mixture essentially comprising said alcohol and a saturated alcohol of at least ten carbon atoms, and a volatile organic solvent for said alcohols, said solvent being substantially immiscible with liquid sulfur dioxide, the extraction being carried out at a temperature at which the saturated alcohol is substantially insoluble and the unsaturated alcohol is substantially soluble.

21. The process of separating oleyl alcohol from mixtures essentially comprising the same and saturated alcohols of at least ten carbon atoms, which comprises extracting said mixture by means of a liquid sulfur dioxide at a temperature at which the saturated alcohol is substantially insoluble and the unsaturated alcohol is substantially soluble.

EBENEZER E. REID.